United States Patent

[11] 3,622,587

[72] Inventors  Lars Anders Fritz Carlson
                Bromma;
                Berndt Olof Harald Sjoberg, Sodertalje;
                Nils Erik Stjernstrom, Sodertalje; Ake John
                Erik Helgstrand, Enhorna, all of Sweden
[21] Appl. No. 807,948
[22] Filed      Mar. 17, 1969
[45] Patented   Nov. 23, 1971
[73] Assignee   Aktiebolaget Astra
                Sodertalje, Sweden
[32] Priority   Mar. 25, 1968
[33]            Great Britain
[31]            13,687/68

[54] CERTAIN 3-PYRIDYLMETHYL-2-(P-CHLORO PHENOXY)-2-METHYL PROPIONATE-N-OXIDES AND DERIVATIVES THEREOF
3 Claims, No Drawings

[52] U.S. Cl. ................................................. 260/295.5 R,
                                                        424/266
[51] Int. Cl. .................................................. C07d 31/34,
                                                        C07d 31/36

[50] Field of Search............................................ 260/295.5 R

[56]            References Cited
                UNITED STATES PATENTS
3,415,836  12/1968  Ekenstam et al. ............ 260/295.5

Primary Examiner—Alan L. Rotman
Attorney—Brumbaugh, Graves, Donohue & Raymond

ABSTRACT: Compounds represented by the formula:

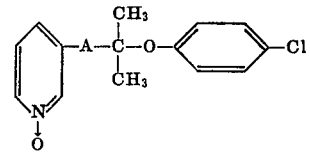

wherein A is a bivalent radical selected from the group consisting of $-COOCH_2-$ and $-CH_2OOC-$, and therapeutically acceptable salts thereof.

CERTAIN 3-PYRIDYLMETHYL-2-(P-CHLORO PHENOXY)-2-METHYL PROPIONATE-N-OXIDES AND DERIVATIVES THEREOF

The present invention relates to compounds having valuable therapeutic properties, and therapeutically acceptable salts thereof. The invention also relates to methods for the preparation of the compounds, to pharmaceutical preparations containing them and to a method for the treatment of certain diseases by administering a therapeutically effective amount of a compound of the invention in association with a pharmaceutically acceptable carrier.

In view of accumulating evidence indicating that excessive serum lipid concentration is correlated to basic pathogenetic mechanisms and to symptoms of several diseases such as vascular diseases, diabetes mellitus, and hyperthyroidism, lowering of serum lipid concentration is important during treatment of such diseases.

According to the present invention it has surprisingly been found, that the compounds of the formula

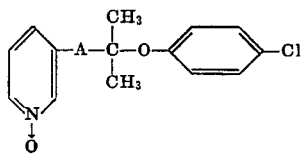

I and therapeutically acceptable salts thereof, wherein A is a bivalent radical selected from the group consisting of —COOCH$_2$— and —CH$_2$OOC—, have valuable hypolipaemic activity. These compounds also have a very low toxicity, and the biological test results indicate that secondary effects occur only to a very limited extent, and at relatively high doses.

The compounds of the formula I may be prepared by known methods such as

A. reacting a pyridine derivative of the formula

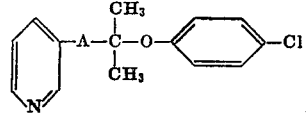

II wherein A has the meaning specified above, with a peroxy compound. Peroxy compounds suitable for use in this method include hydrogen peroxide, peralkanoic acids such as performic acid and peracetic acid, aromatic peroxy acids such as perbenzoic acid and perpthalic acid, inorganic peroxy acids such as monopersulfuric acid, and other organic and inorganic peroxidic reagent. The preferred peroxy compound is hydrogen peroxide. The reaction is preferably conducted in an unreactive solvent such as chloroform, ethylene dichloride, acetic acid or propionic acid.

The pyridine derivatives used as starting materials in the above method may be prepared by methods well known per se.

B. reacting a compound of the formula

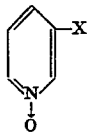

III wherein X is a carboxyl group, or a functionally equivalent derivative thereof, with a compound of the formula

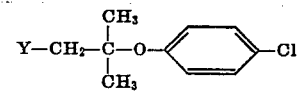

IV wherein Y is a hydroxyl group, or a functionally equivalent derivative thereof, to the formation of a compound of the formula I wherein A is —COOCH$_2$—.

C. reacting a compound of the formula

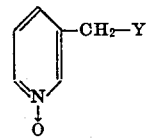

V wherein Y is a hydroxyl group, or a functionally equivalent derivative thereof, with a compound of the formula

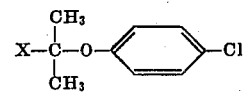

VI wherein X is a carboxyl group, or functionally equivalent derivative thereof, to the formation of a compound of the formula I wherein A is —Ch$_2$OOC—. As examples of functionally equivalent derivatives of the compounds III and VI may be mentioned compounds wherein X is a metal carboxylate group, and compounds which are derivatives of carboxylic acid such as an acid halide, an alkyl ester, an acid anhydride, mixed anhydrides with alkoxy formic acids, carboxylic acids, sulfonic acids and inorganic acids, and derivatives obtained by reaction between a carboxylic acid and a member of the group consisting of carbodiimide and similarly functioning compounds such as N,N'-carbonyldiimidazole and N-ethyl-5phenylisoxazolium-3"-sulfonate. As examples of functionally equivalent derivatives of the compounds IV and V may be mentioned compounds wherein Y is halogen such as chlorine and bromine. In clinical practice the compounds of the present invention will normally be administered orally, rectally or by injection in the form of pharmaceutical preparations comprising the active ingredient in the form of the free base or a pharmaceutically acceptable salt thereof, e.g. the hydrochloride, in association with a pharmaceutically acceptable carrier which may be a solid, semisolid or liquid diluent or an ingestible capsule, and such preparations comprise a further aspect of the invention. Usually the active substance will comprise between 0.1 and 95 percent by weight of the preparation, for example, between 0.5 and 20 percent for preparations intended for injection and between 0.1 and 50 percent for preparations intended for oral administration.

To produce pharmaceutical preparations in the form of dosage units for oral application containing a compound of the invention in the form of the free base, or a pharmaceutically acceptable salt thereof, the active ingredient may be mixed with a solid, pulverulent carrier, for example lactose, saccharose, sorbitol, mannite, a starch such as potato starch, corn starch, amylopectin, laminaria powder or citrus pulp powder, a cellulose derivative or gelatine, and also may include lubricants such as magnesium or calcium stearate or a Carbowax or other polyethylene glycol wax and compressed to form tablets or centers for dragees. If dragees are required, the centers may be coated, for example with concentrated sugar solutions which may contain gum arabic, talc and/or titanium dioxide, or alternatively with a lacquer dissolved in easily volatile organic solvents or mixtures of organic solvents. Dyestuffs can be added to these coatings, for example, to distinguish between different contents of active substance. For the preparation of soft gelatin capsules (pearl-shaped closed capsules) consisting of gelatin and, for example, glycerin, or similar closed capsules, the active substance may be admixed with a Carbowax. Hard gelatin capsules may contain granulates of the active substance with solid, pulverulent carriers such as lactose, saccharose, sorbitol, mannite, starches (for example potato starch, corn starch or amylopectin), cellulose derivatives or gelatin, and may also include magnesium stearate or stearic acid. Dosage units for rectal application may be in the form of suppositories comprising the active substance in admixture with a neutral fatty base, or gelatin rectal capsules comprising the active substance in admixture with a Carbowax or other polyethylene glycol wax.

Liquid preparations for oral application may be in the form of syrups or suspensions, for example solutions containing from about 0.1 percent to 20 percent by weight of active substance, sugar and a mixture of ethanol, water, glycerine, propyleneglycol and, optionally, aroma, saccharine and/or carboxymethylcellulose as a dispersing agent.

For parenteral application by injection preparations may comprise an aqueous solution of a water soluble pharmaceutically acceptable salt of the active substance desirably in a concentration of 0.5—10 percent, and optionally also a stabilizing agent and/or buffer substance in aqueous solution. Dosage units of the solution may advantageously be enclosed in ampuls.

The administration of about 1 gram of the active substance p.o. three times a day may be recommended at therapeutical treatment of hyperlipaemia.

The invention is further illustrated by the following examples.

Example 1. Preparation of 3-pyridinemethyl 2-(p-chlorophenoxy) -2-methylpropionate N-oxide 3-Pyridinemethyl 2-(p-chlorophenoxy)-2-methylpropionate (35.0 g.) was mixed with 120 ml. of acetic acid and 22 ml. of 30 percent aqueous hydrogen peroxide and the solution heated at 70° C. during 16 hours. The solution was evaporated in vacuo, the residue mixed with water and aqueous sodium hydrogen carbonate until pH 5 and the mixture evaporated again. The residue was soaked with 3 portions of chloroform. The chloroform solution was evaporated to give 35.4 g. solid product. It was dried over solid sodium hydroxide in vacuo to give 33.3 g., m.p. 75°–80° C. Recrystallization from a mixture of benzene and cyclohexane gave 24.60 g. product, m.p. 88°–91 C. Analysis; Found: C 59.4, H 5.03, Cl 11.3, N 4.35 and O 19.7 percent; Calculated for $C_{16}H_{16}ClNO_4$: C 59.72, H 5.01, Cl 11.02, N 4.35 and O 19.90 percent.

Example 2. Preparation of 2-(p-chlorophenoxy)-2-methylpropyl nicotinate N-oxide 2-(p-Chlorophenoxy)-2-methylpropyl nicotinate (6.1 g.) was dissolved in a mixture of 30 percent aqueous hydrogen peroxide (3.5 ml.) and acetic acid (20 ml.) and the solution heated at 70° C. during 17.5 hours. The solution was evaporated in vacuo, 10 ml. of water added to the residue and the mixture evaporated again. It was obtained 6.3 g. oil which crystallized upon triturating with petroleum ether. Repeated recrystallization from a mixture of petroleum ether and ethyl acetate gave m.p. 96°–98° C. Analyses: Found: C 60.3, H 5.02, Cl 11.1, N 4.3, and O 19.6 percent; calculated for $C_{16}H_{16}Cl NO_4$: C 59.72, H 5.01, Cl 11.02, N 4.35 and O 19.90 percent. The following examples illustrate how the compounds of the instant invention can be incorporated in pharmaceutical compositions.

Example 3. Preparation of soft gelatin capsules 500 g. of active substance were mixed with 500 g. of corn oil whereafter the mixture was filled in soft gelatin capsules, each capsule containing 100 mg. of mixture (i.e. 50 mg. of active substance).

Example 4. Preparation of soft gelatin capsules 500 g. of active substance were mixed with 750 g. of peanut oil whereafter the mixture was filled in soft gelatin capsules, each capsule containing 125 mg. of mixture (i.e. 50 mg. of active substance).

Example 5. Preparation of tablets 50 kg. of active substance were mixed with 20 kg. of silicon dioxide of the trade mark Aerosil, whereafter 45 kg. of potato starch and 50 kg. of lactose were mixed in and the mixture moistened with a starch paste prepared from 5 kg. of potato starch and distilled water, whereafter the mixture was granulated through a sieve. The granulate was dried and sieved whereafter 2 kg. of magnesium stearate were mixed in. Finally the mixture was pressed into tablets, each weighing 172 mg.

Example 6. Preparation of an emulsion 100 g. of active substance were dissolved in 2,500 g. of peanut oil. From the solution thus obtained, 90 g. of Gum Arabic, aroma and color (q.s.) and 2,500 g. of water an emulsion was prepared.

Example 7. Preparation of a syrup 100 g. of active substance were dissolved in 300 g. of 95 percent ethanol where 300 g. of glycerol, aroma and color (q.s.) and water 1,000 ml. were mixed in. A syrup was thus obtained.

Example 8. Preparation of a solution 100 g. of active substance were dissolved in 2,000 g. of polyoxyethylene sorbitan monooleate, whereafter aroma and color (q.s.) and water to 5,000 ml. were mixed in. A drop solution was thus obtained.

Example 9. Preparation of a syrup containing vitamins

The syrup was prepared from the following ingredients:

| | |
|---|---|
| Active substance | 7.0 g. |
| polyoxyethylenesorbitol monooleate | 0.4 g. |
| vitamin A | 12,000 IE |
| vitamin C | 2 g. |
| vitamin $B_1$ | 50 mg. |
| vitamin $B_2$ | 70 mg. |
| vitamin $B_6$ | 10 mg. |
| pantothenol | 100 mg. |
| caffeine | 300 mg. |
| sorbitol | 20 mg. |
| aroma, color | |
| water | to 100 ml. |

Vitamin A was dissolved in the polyoxyethylene sorbitan monooleate while heating to about 60° C., whereafter 20 ml. of water was mixed in. The caffeine was dissolved in 10 ml. of water, while hating to about 90° C. The remaining ingredients were mixed in about 60 ml. of water, whereafter the vitamin A and caffeine solutions were added while stirring. The pH was adjusted to 4.5–5.5 by addition of sodium hydroxide solution and the syrup made up to 100 ml. with water. The whole procedure was carried out in nitrogen atmosphere. A normal dose is contained in 15 ml. of the syrup.

Example 10. Preparation of effervescent tablets 100 g. of active substance, 140 g. of finely divided citric acid, 110 g. of finely divided sodium hydrogen carbonate, 3.5 g. of magnesium stearate and aroma (q.s.) were mixed and the mixture was pressed into tablets, each containing 100 mg. of active substance.

Example 11. Preparation of a drop solution 100 g. of active substance were mixed with 300 g. of ethanol, whereafter 300 g. of glycerol, water to 1,000 ml., aroma and color (q.s.) and 0.1 N sodium hydroxide solution (to pH 4.5–5.5) were added while stirring. A drop solution was thus obtained.

Example 12. Preparation of a sustained release tablet 200 g. of active substance were melted together with 50 g. of stearic acid and 50 g. of carnauba wax. The mixture thus obtained was cooled and ground to a particle size of at most 1 mm. (diameter). The mass thus obtained was mixed with 5 g. of magnesium stearate and pressed into tablets each weighing 305 mg. Each tablet thus contains 200 mg. of active substance.

BIOLOGICAL TESTS

A. Toxicity

The acute toxicity in mice of the compounds of the formula I after i.p. and i.v. administration is given as $LD_{50}$, in grams per kg. bodyweight, in table I. The compound 2-(p-chlorophenoxy)-2-methylpropyl nicotinate N-oxide is denoted Ia in the table. Similarly, the compound 3-pyridinemethyl 2-p-chlorophenoxy)-2-methyl-propionate is denoted Ib.

TABLE I

| Substance | Administration | $LD_{50}$, g./kg. bodyweight | Number of animals used |
|---|---|---|---|
| Compound Ia | I.p. | Between 1 and 2 | 30 |
| Compound Ib | I.p. | 1 | 30 |
| Compound Ib | I.v. | 1 | 30 |

The toxicity by i.v. administration for the compound Ia could not be estimated due to the sparse solubility of this substance.

B. Effect on the level of triglycerides in the plasma of rats

Groups of male rats, strain Sprague-Dawley, having an average body weight of 150–200 g., were used. The analysis was carried out by the method described by L. A. Carlsson, J. Atheroscler Res. 3,334 (1963).

Each group consisted of six animals which were fed during eight days with a food containing the substance to be tested. The test substances were added in the proportion 1 g. of substance per kilogram food. The animals were supplied with water throughout the test. On the 8th day of the test period the animals were killed and 5 ml. blood was taken from the aorta of each animal and collected in heparinized tubes. In order to obtain a sufficient amount of blood for the analysis, the blood from the animals was combined for each triglyceride test.

The result is shown in table II. Each value is the average of tests on three samples from each group of animals. Each sample contains plasma from two animals.

TABLE II

| Substance | Triglyceride $\mu$mol./ml. plasma |
|---|---|
| Untreated animals | 0.76 |
| Nicotinic acid | 0.50 |
| Substance Ia | 0.43 |
| Substance Ib | 0.29 |

C. Effect on the cholesterol level in the plasma of rats

The analysis of the cholesterol level in the plasma of rats were carried out by the Tschugaeff color reaction as described by Hanel and Dam, Acta Chem. Scand. 9,677 (1955) after extraction of the plasma lipids with methanol/chloroform. The animals were treated in the same way as described under B above. The same strain of rats was used and the results are given in table III in a way analogous to that under B above.

TABLE III

| Substance | Cholesterol $\gamma$/ml. plasma |
|---|---|
| Untreated animals | 656 |
| Nictinic acid | 624 |
| Substance Ia | 626 |
| Substance Ib | 464 |

D. Effect of the compound Ib on the level of free fatty acids in the plasma of rats The analysis of the level of free fatty acids in the plasma of dogs were carried out using a combination of the methods described by Dole, Journal of Clinical Investigation 35,195 (1965) and Trout et al. Journal of Lipid Research 1, 199 (1960).

The animals were treated in the same way as described under B above. The same strain of rats was used and the results are given in table IV in a way analogous to that under B above.

TABLE IV

| Substance | Free fatty acids $\mu$:v/ml. plasma |
|---|---|
| Untreated animals | 0.85 |
| Nicotinic acid | 0.73 |
| Substance Ib | 0.52 |

Although one must be extremely careful when evaluating results from biological tests, the results shown in tables I and II above seem to indicate that the compounds Ia and Ib of the present invention are capable of lowering the plasma level of triglycerides and the level of cholesterol in the tested animals, and that compound Ib seems to have a lowering effect also on the plasma level of free fatty acids.

E. Peripheral vascular effects

The peripheral vascular effect of the compound of the formula I was measured and compared to the vascular effect of nicotinic acid. The test was carried out by recording the skin temperature of the guinea-pig ear.

Male guinea pigs weighing 250–300 g. were anaesthetized by intraperitoneal injection of 1,500 mg./kg. bodyweight of urethane (6 ml. of a 25 percent w/v solution). An iron-constantan thermocouple, type RM6, Ellab Instruments, Copenhagen, Denmark, was placed with its thermojunction in contact with the skin surface of the ear. The skin temperature was recorded on a strip chart recorder, type Z8, Ellab Instruments, Copenhagen, Denmark. The accuracy of the recordings was ±0.1° C.

The animals were injected intraperitoneally with the test compounds in doses of 150, 50 and 15 mg./kg. bodyweight. The test compounds were administered as suspensions in 0.9 percent NaCl containing 2 percent methylcellulose. The pH and the tonicity of the solutions were adjusted to physiological levels by adding the appropriate amount of NaCl, NaOH and HCl. The compounds were given in a volume of 8.0 ml./kg. bodyweight. An increase in skin temperature of at least 0.3° C. above the predrug value was considered as a significant effect. The tests were carried out at room temperature of 22°–23° C.

In 15 control animals the intraperitoneal administration of 8.0 ml./kg. bodyweight of a 0.9 percent NaCl solution gave a small and gradual decrease in ear temperature in all animals which amounted to 0.3°±0.2° C. 60 minutes after the injection. In 15 animals injected with 8.0 ml./kg. bodyweight of a 0.9 percent solution containing 2 percent methycellulose there was a similar decrease in temperature amounting to 0.3°±0.3° C. A rise in skin temperature of at least 0.3° C. was therefore considered as indicating a vasodilatory effect of the compound.

Nicotinic acid, which was used as reference, gave a significant increase in temperature in doses between 5 and 150 mg./kg. bodyweight. In most cases the rise in temperature started within two minutes after the injection and reacted its peak value after 3–8 minutes. The temperature returned to predrug values usually 10–20 minutes after the onset of the rise. As seen in table I below there was a fairly large interindividual variation with respect to the magnitude of the effect. No correlation was found between the maximum rise in skin temperature and the dose given.

The result of the test is shown in table V, wherein the influence of a single intraperitoneal injection of various doses of nicotinic acid, 2-(p-chlorophenoxy)-2-methylpropyl nicotinate N-oxide (in the table denoted "compound Ia") and 3-pyridinemethyl 2-(p-chlorophenoxy)-2-methylpropionate N-oxide (in the table denoted "compound Ib") on the ear skin temperature of guinea pigs anaesthetized with urethane is given.

TABLE V

| Substance | Dose mg./kg. bodyweight | Number of responders/ number of animals injected | Maximum rise in ear temperature, °C. |
|---|---|---|---|
| Nicotinic acid | 1.5 | 2/10 | 1.2; 0.4 |
|  | 5 | 6/10 | 1.4±1.1 |
|  | 15 | 7/15 | 1.7±0.8 |
|  | 30 | 13/15 | 1.3±0.8 |
|  | 50 | 12/16 | 2.2±1.2 |
|  | 100 | 14/15 | 2.2±1.1 |
|  | 150 | 21/29 | 1.8±1.0 |
| Compound Ia | 15 | 0/4 |  |
|  | 50 | 0/4 |  |
|  | 150 | 0/4 |  |
| Compound Ib | 15 | 0/5 |  |
|  | 50 | 0/4 |  |
|  | 150 | 0/4 |  |

The table shows that no effects on skin temperature were recorded in animals injected with the test compounds Ia and Ib in doses of 15, 50 and 150 mg./kg. bodyweight, while nicotinic acid produced a marked rise in skin temperature of the ear.

It is known that nicotinic acid has a hypolipaemic effect, and it is also used as a hypolipaemic agent. Its peripheral vasodilatory effect, however, reduces its therapeutical use, since this substance even in small doses cause an intensive flush in combination with skin irritation. As is seen from tables II, III and IV, the compounds of the present invention have a hypolipaemic activity which is better, or at least about equal to that of nicotinic acid, but they exhibit no peripheral vascular effects. These very favorable and unexpected properties in combination with the extremely low toxicity of the compounds of the present invention represent a great step forward in this medicinal field.

We claim:

1. A member of the group consisting of the compounds represented by the formula:

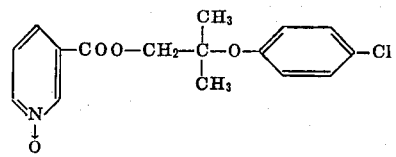

and therapeutically acceptable salts thereof, wherein A is a bivalent radical selected from the group consisting of —COOCH$_2$— and —CH$_2$OOC—.

2. The compound represented by the formula:

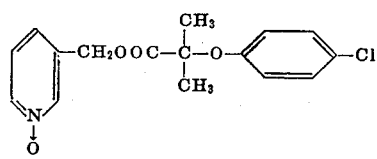

and therapeutically acceptable salts thereof.

3. The compound represented by the formula:

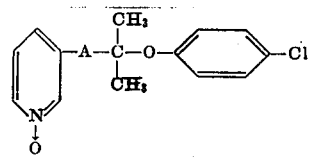

and therapeutically acceptable salts thereof.

* * * * *

PO-1050
(5/69)

UNITED STATES PATENT OFFICE
CERTIFICATE OF CORRECTION

Patent No. 3,622,587                    Dated   November 23, 1971

Inventor(s)    Lars Anders Fritz Carlson, et al

It is certified that error appears in the above-identified patent
and that said Letters Patent are hereby corrected as shown below:

Col. 2, line 23, "Ch" should be -- CH --

Col. 2, line 34, -3" should be -3'

Col. 3, line 44, "88°-91C" should be -- 88-91°C

Col. 5, line 37, "Carlsson" should be -- Carlson --

Col. 6, line 22, "v/ml plasma" should be -- µekv/ml plasma --

Col. 8, claim 1, lines 14-19, formula

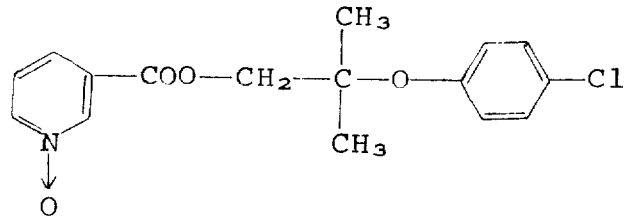

should read:

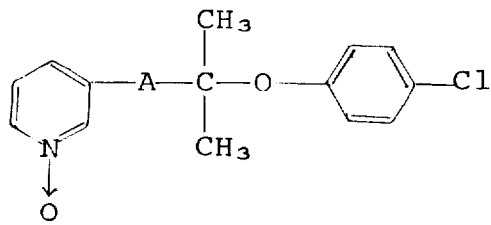

PO-1050
(5/69)

UNITED STATES PATENT OFFICE
CERTIFICATE OF CORRECTION

PAGE 2

Patent No. 3,622,587            Dated   November 23, 1971

Inventor(s)  Lars Anders Fritz Carlson, et al

It is certified that error appears in the above-identified patent and that said Letters Patent are hereby corrected as shown below:

Col. 8, claim 3, lines 34-38, formula

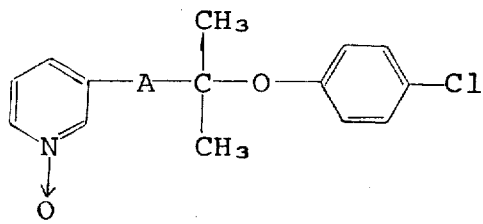

should read:

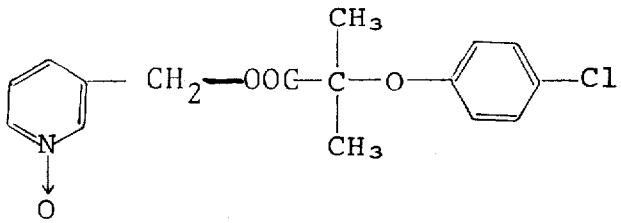

Signed and sealed this 4th day of July 1972.

(SEAL)
Attest:

EDWARD M. FLETCHER, JR.          ROBERT GOTTSCHALK
Attesting Officer                Commissioner of Patents

UNITED STATES PATENT OFFICE
CERTIFICATE OF CORRECTION

Patent No. 3,622,587  Dated November 23, 1971

Inventor(s) Lars Anders Fritz Carlson, et. al.

It is certified that error appears in the above-identified patent and that said Letters Patent are hereby corrected as shown below:

Claims 1, 2 and 3 should read as shown on the attached sheet.

Signed and sealed this 26th day of December 1972.

(SEAL)
Attest:

EDWARD M. FLETCHER, JR.
Attesting Officer

ROBERT GOTTSCHALK
Commissioner of Patents